(No Model.)

F. BURMEISTER.
STOP AND WASTE COCK.

No. 562,569. Patented June 23, 1896.

WITNESSES:
H. P. Bailey
J. H. Bleasdale

INVENTOR:
F. Burmeister,
by Burridge & Cutter,
Attys.

UNITED STATES PATENT OFFICE.

FREDERICK BURMEISTER, OF CLEVELAND, OHIO.

STOP AND WASTE COCK.

SPECIFICATION forming part of Letters Patent No. 562,569, dated June 23, 1896.

Application filed February 29, 1896. Serial No. 581,263. (No model.)

*To all whom it may concern:*

Be it known that I, FREDERICK BURMEISTER, a citizen of the United States, residing at Cleveland, in the county of Cuyahoga and State of Ohio, have invented certain new and useful Improvements in Stop and Waste Cocks, of which the following is a full, clear, and exact description.

My invention relates to valves commonly called "stop and waste cocks," employed in shutting off water at or near the junction of the supply-pipe with the main inlet-pipe and so arranged as to permit the liquid which remains in said supply-pipe to drain off; and it consists of the several parts and combinations of parts hereinafter fully described and especially claimed.

The object of my improvement is to provide a stop and waste cock of the class designated above, which is effective but simple and inexpensive in construction, arranged to make only one-quarter turn, and capable of being easily changed to adapt itself to the coupling regardless of whichever end of said coupling is connected to the main pipe. Being limited in movement to a quarter-turn insures for my device perfect registration of the plug-opening with the coupling-passages on the one hand, and absolute closing of the inlet-passage on the other, while the interchangeable arrangement permits of the use of said device in either a right or left hand connection. Cocks of this class are often placed below the surface of the ground and are thereby liable to become clogged with dirt or sand, but the tight construction of my invention obviates this difficulty.

That my invention may be seen and fully understood by others, reference will be had to the following specification and annexed drawings, forming a part thereof, in which—

Figure 1:
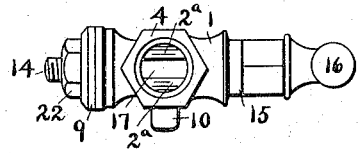
Figure 2:
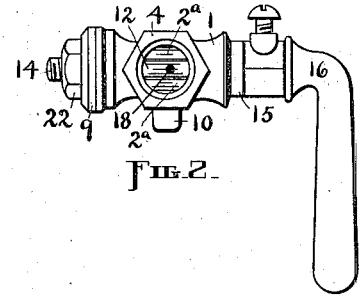
Figure 3:
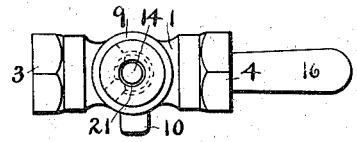
Figure 4:
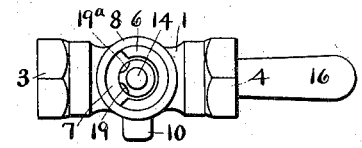
Figure 5:
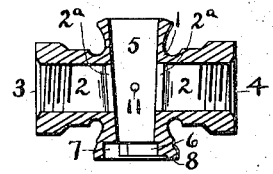
Figure 6:
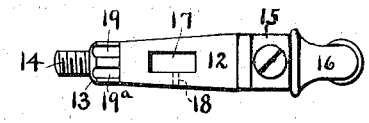
Figure 7:
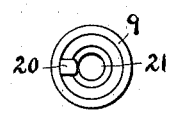
Figure 8:
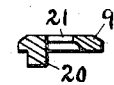

Figure 1 is a side view of my device, showing the outlet or supply pipe end of the coupling, the valve being open; Fig. 2, a similar view with the valve closed; Fig. 3, a rear side view of the coupling, the nut being removed; Fig. 4, a similar view with both nut and washer removed; Fig. 5, a horizontal sectional view of the coupling; Fig. 6, a rear side view of the plug; Fig. 7, an inside view of the washer, and Fig. 8 a sectional view of the same.

Similar figures of reference designate like parts in the drawings and specification.

The coupling 1 has the longitudinal inlet and outlet passages 2 2 therein, the walls of which are threaded at their outer ends. The end 3 is for attachment to a main water-pipe and the end 4 for attachment to a supply-pipe. The coupling 1 is in the form of a cross and has the tapering passage 5 extending nearly through the same, the central line of said passage cutting the central line of the passages 2 at right angles. Beyond the small end of the passage 5 in the coupling 1, and integral with said coupling, is the segmental shoulder 6, somewhat greater than a half-circle in circumference. The recess 7 appears between the ends of the shoulder 6, the floor of said recess being formed by the metal surrounding the small end of the passage 5. The inside diameter of the shoulder 6 is a little greater than that of the small end of the passage 5. The rim 8 of the coupling 1 is raised slightly above the shoulder 6 to form a seat for the washer 9. The projection 10 is centrally located on the bottom of the coupling 1 and communicates with the passage 5 through the opening 11. The projection 10 should be connected by a small pipe with the sewer.

The valve or plug 12 tapers to conform to the coupling-passage 5, in which said plug operates, and has the rounded head 13 and threaded terminal 14 at one end, with the socket 15 at the opposite end, to which the handle 16 is attached. The transverse slot 17 extends through the plug 12 and registers with the coupling-passages 2 when the valve is open. The small hole 18 opens from the slot 17 at right angles through one side of the plug 12. In the head 13 are the horizontal grooves 19 and 19ª, the extreme opposite edges of which are in the same radii with the ends of the shoulder 6, or substantially so, said radii starting from the center of the plug 12. Each side of the passage 5, at adjacent ends of the passages 2, are the lips 2ª, leaving openings between each pair of the same size as the plug-slot 17. The lips 2ª assist in forming a seat for the plug 12.

The washer 9 is provided with the lug 20, which may register with either of the grooves 19 or 19ª, and operates in the recess 7. The washer 9 has the opening 21 of larger diameter than the plug-terminal 14, to receive said terminal, and the inner face of said washer is concaved to receive the end of the head 13. The nut 22 is threaded to the terminal 14 and holds the washer 9 and the plug 12 in place, said washer bearing on the coupling edge 8. In Figs. 1, 2, and 3 the lug 20 engages the groove 19 and makes the coupling 1 a right-hand connection. If a left-hand connection is desired, it is only necessary to unscrew the nut 22, separate the washer 9 from the rim 8 until the lug 20 clears the groove 19, engage said lug with the groove 19ª, and reseat said nut. The terminal 14 is long enough to permit of the above change without entirely removing the nut 22. The width of the lug 20 added to the circumference of the shoulder 6 comprises three-quarters of a circle. Hence the movement of the plug 12 is thus limited to one-quarter. The fittings about the head 13 and terminal 14 of the plug 12 are so close as to render my invention practically sand and dirt proof.

When the plug 12 stands as shown in Fig. 1, the hole 18 is turned up against the top of the coupling 1 and water enters said coupling from the main pipe at the end 3, passes through the now horizontal slot 17, and leaves at the end 4. When the plug 12 stands as shown in Fig. 2, the slot 17 is perpendicular and the imperforate side of said plug is presented toward the end 3, thus closing the corresponding passage 2, while the hole 18 is presented toward the end 4 to receive the waste water from the supply-pipe and permit the same to escape through said slot 17 and the opening 11 in the coupling 1.

Two lugs may be formed on the washer 9 and three grooves in the head 13, if necessary for greater strength, without departing from the nature of my invention.

What I claim as my invention, and desire to secure by Letters Patent, is—

The combination in a stop and waste cock, of a coupling having the segmental shoulder 6 and the recess 7 at one end of the plug-passage, a valve-plug provided with the threaded terminal 14 and the head 13 having the horizontal grooves 19 19ª therein, a washer fitting loosely over said terminal with the lug 20 adapted to register with either of said grooves and operate in said recess, and a nut threaded to said terminal for securing said washer and plug in place, substantially as and for the purpose set forth.

In testimony whereof I affix my signature in presence of two witnesses.

FREDERICK BURMEISTER.

Witnesses:
F. A. CUTTER,
I. A. HERMANN.